(12) United States Patent
Huang (10) Patent No.: US 6,956,628 B2
(45) Date of Patent: Oct. 18, 2005

(54) VIEW ANGLE-ADJUSTABLE DETACHABLE DISPLAY ASSEMBLY

(75) Inventor: Fu-Ruei Huang, PingJen (TW)

(73) Assignee: Hexa-Chain Co., Ltd., Taoyuan Hsien (TW)

( * ) Notice: Subject to any disclaimer, the term of this patent is extended or adjusted under 35 U.S.C. 154(b) by 122 days.

(21) Appl. No.: 10/747,178

(22) Filed: Dec. 30, 2003

(65) Prior Publication Data

US 2005/0140845 A1 Jun. 30, 2005

(51) Int. Cl.7 .......................................... G02F 1/1333
(52) U.S. Cl. ..................... 349/58; 349/58; 349/149; 349/150; 349/152
(58) Field of Search .................. 297/217.3, 217.4; 349/58, 149–150, 152; 361/681; 248/178, 248/917; 340/700; 359/330

(56) References Cited

U.S. PATENT DOCUMENTS

| 5,583,529 | A | * | 12/1996 | Satou | 345/87 |
| 6,144,552 | A | * | 11/2000 | Whitcher et al. | 361/681 |
| 6,229,695 | B1 | * | 5/2001 | Moon | 361/683 |
| 6,522,372 | B2 | * | 2/2003 | Yang | 349/58 |

* cited by examiner

Primary Examiner—Dung T. Nguyen
Assistant Examiner—(Nancy) Thanh-Nhan P. Nguyen
(74) Attorney, Agent, or Firm—Rosenberg, Klein & Lee (57) ABSTRACT

A view angle-adjustable detachable display assembly includes an outer casing mountable in the back opening of the headrest of a vehicle seat, an inner casing fastened pivotally with the inside of the outer casing, an electric contact connector held in a connector holder in the inner casing and connected to a circuit board inside the outer casing through a flexible bus line, and a display panel detachably fastened to the inside of the inner casing by a hook joint.

5 Claims, 10 Drawing Sheets

FIG.10

VIEW ANGLE-ADJUSTABLE DETACHABLE DISPLAY ASSEMBLY

BACKGROUND OF THE INVENTION a. Field of the Invention

The present invention relates to a display device and, more particularly, to a view angle-adjustable detachable display assembly.

b. Description of the Related Art

Figure 1:
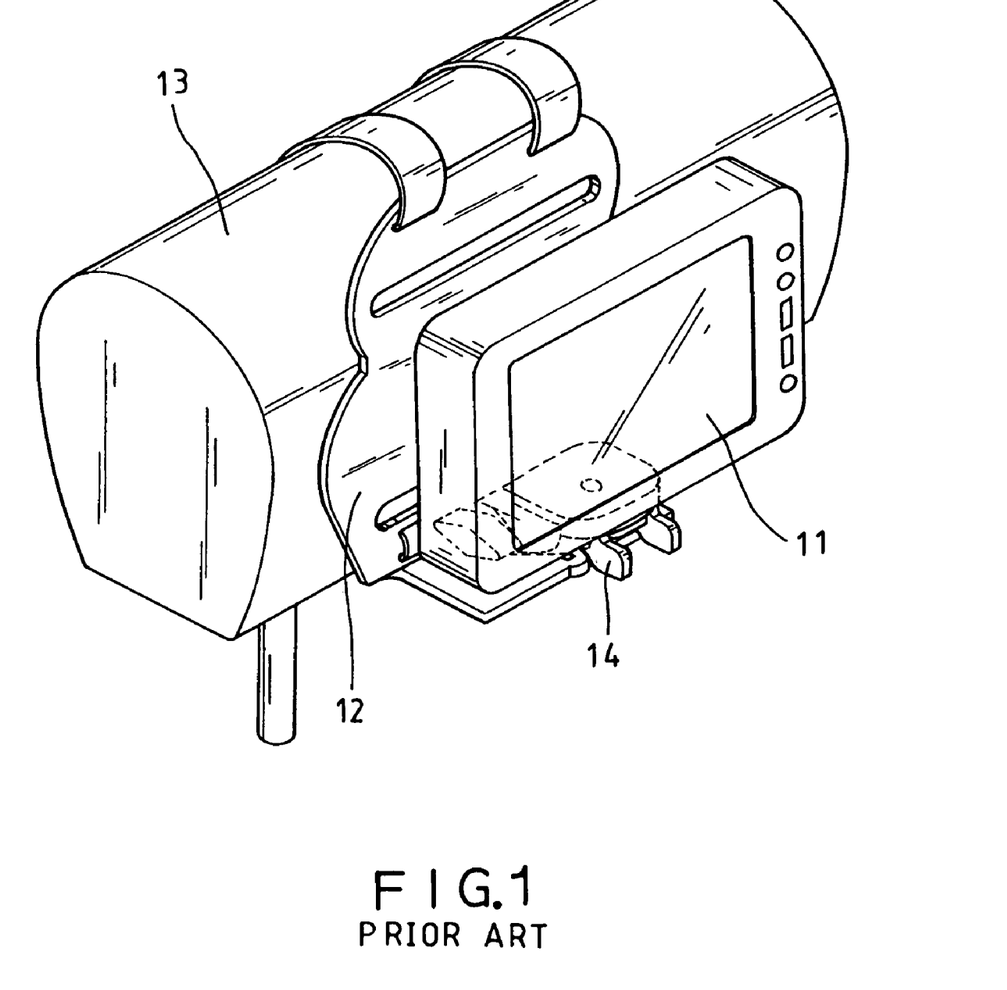
FIG. 1 is illustrates a display device carried on a mounting device fastened to the headrest of a seat according to Taiwan Patent Publication No. 520723.

In recent years, various small-size display apparatus have been well developed. These small-size display apparatus are not expensive, and have been intensively used in automobiles. Conventional display apparatus for use in an automobile may be installed in the instrument panel, console, ceiling, or seat. When in use, the display panel is pulled or turned out of the mounting shell from the close position to the open position. Installing a display apparatus in the ceiling of an automobile may interfere with the backward view angle of the driver. FIG. 1 shows a display device 11 carried on a mounting device 12 fastened to the headrest 13 of a vehicle seat according to Taiwan Patent Publication No. 520723. The mounting device 12 comprises adjustable means 14 adapted to adjust the view angle of the display device 11.

Figure 2:
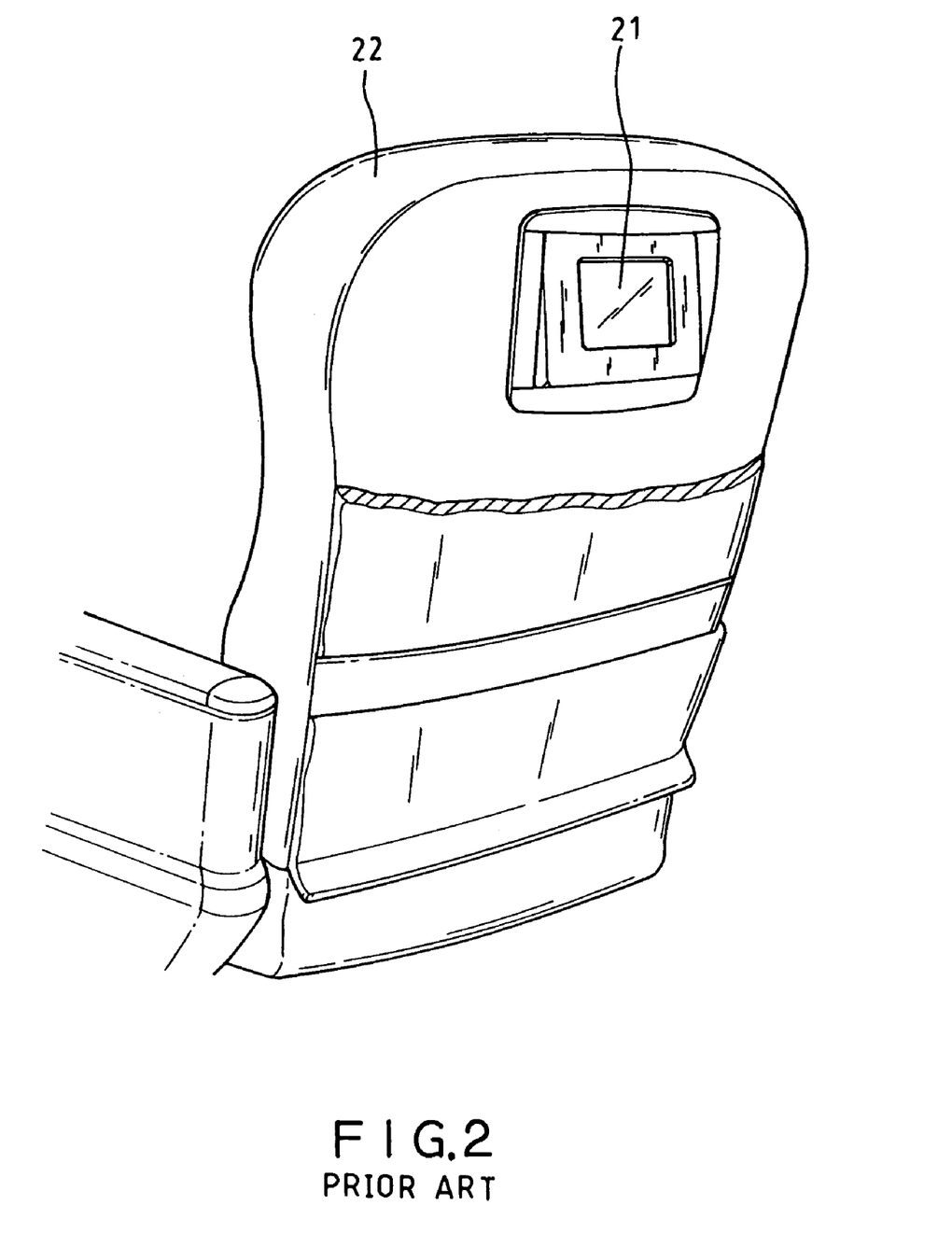
FIG. 2 illustrates an automatically adjustable display screen assembly installed in the back of a seat according to U.S. Pat. No. 5,507,556.
Figure 3:
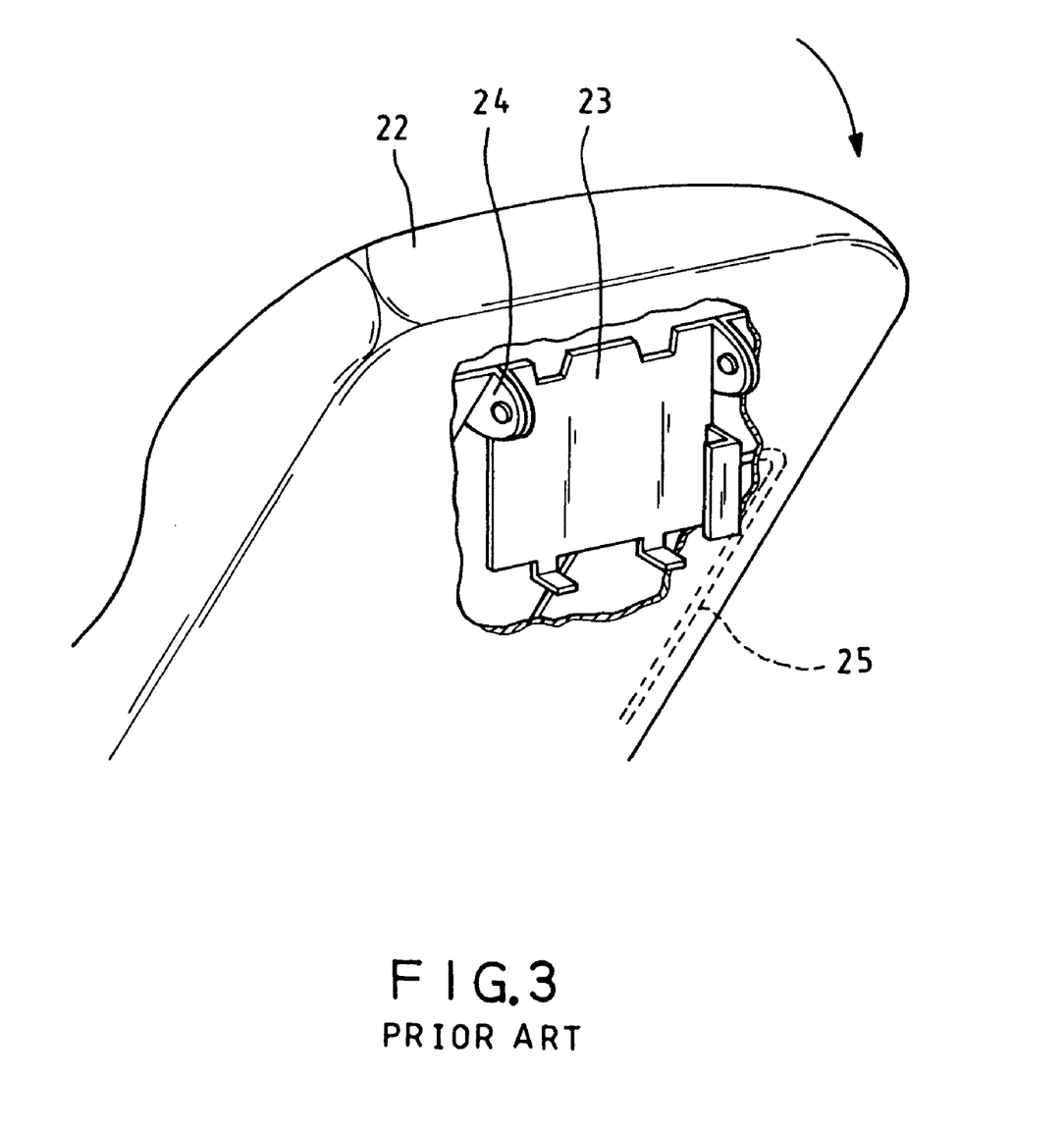
FIG. 3 illustrates the structure of the seat back of the seat according to U.S. Pat. No. 5,507,556.

FIGS. 2 and 3 illustrate an automatically adjustable display screen assembly installed in the back of a seat according to U.S. Pat. No. 5,507,556. According to this design, the seat 22 comprises a movable seat back 23 pivoted to lugs 24 at the seat bottom of the seat 22 and adapted to hold the display screen assembly 21, and a control cable assembly 25 automatically controlling the pivoting movement of the display screen assembly 21 relative to the seat back 23. This display screen assembly mounting arrangement is complicated. After installation, the display screen assembly 21 is not detachable from the seat back 23 of the seat 22.

Further, Taiwan patent publication No. 540496 discloses a pillow type display mounting structure, which was an invention of the present inventor. According to this design, this design of pillow type display mounting structure does not require any additional installation space because it is fitted into the back opening of the headrest of the vehicle seat. Further, when the display panel set in the operative position, it does not interfere with the backward view angle of the vehicle's driver. However, this design is not detachable. The display panel cannot be removed from the mounting structure for keeping in a place outside the vehicle, and the display panel may easily be stolen by a thief when nobody stays inside the vehicle.

SUMMARY OF THE INVENTION

The present invention has been accomplished under the circumstances in view. It is one object of the present invention to provide a view angle-adjustable detachable display assembly that can be mounted in the back opening of the headrest of a vehicle seat and adjusted to the desired view angle. It is another object of the present invention to provide a view angle-adjustable detachable display assembly, which enables the user to take the display panel away when leaving the seat.

To achieve these and other objects of the present invention, the view angle-adjustable detachable display assembly comprises an outer casing connectable to the back opening of the headrest of a vehicle seat, the outer casing comprising a cable, a contact connector connected to the cable and adapted to receive electric signal from the cable, and two pivot housings disposed at two opposite lateral sides; an inner casing fastened pivotally with the inside of the outer casing, the inner casing comprising two pivots axially aligned at two opposite lateral sides thereof and respectively pivoted to the pivot housings of the outer casing, a connector holder, which holds the contact connector of the outer casing, a plurality of springy hooks symmetrically disposed at top and bottom sides thereof, and a plurality of spring strips protruding from a bottom wall thereof; and a display panel insertable into the inner casing, the display panel comprising a plurality of hook holes, which are respectively forced into engagement with the springy hooks of the inner casing upon insertion of the display panel into the inner casing, an electric interface, which is electrically connected to the contact connector in the connector holder upon insertion of the display panel into the inner casing, and a back side, which is supported on the spring strips of the inner casing upon insertion of the display panel into the inner casing.

DETAILED DESCRIPTION OF THE PREFERRED EMBODIMENTS

Figure 4:
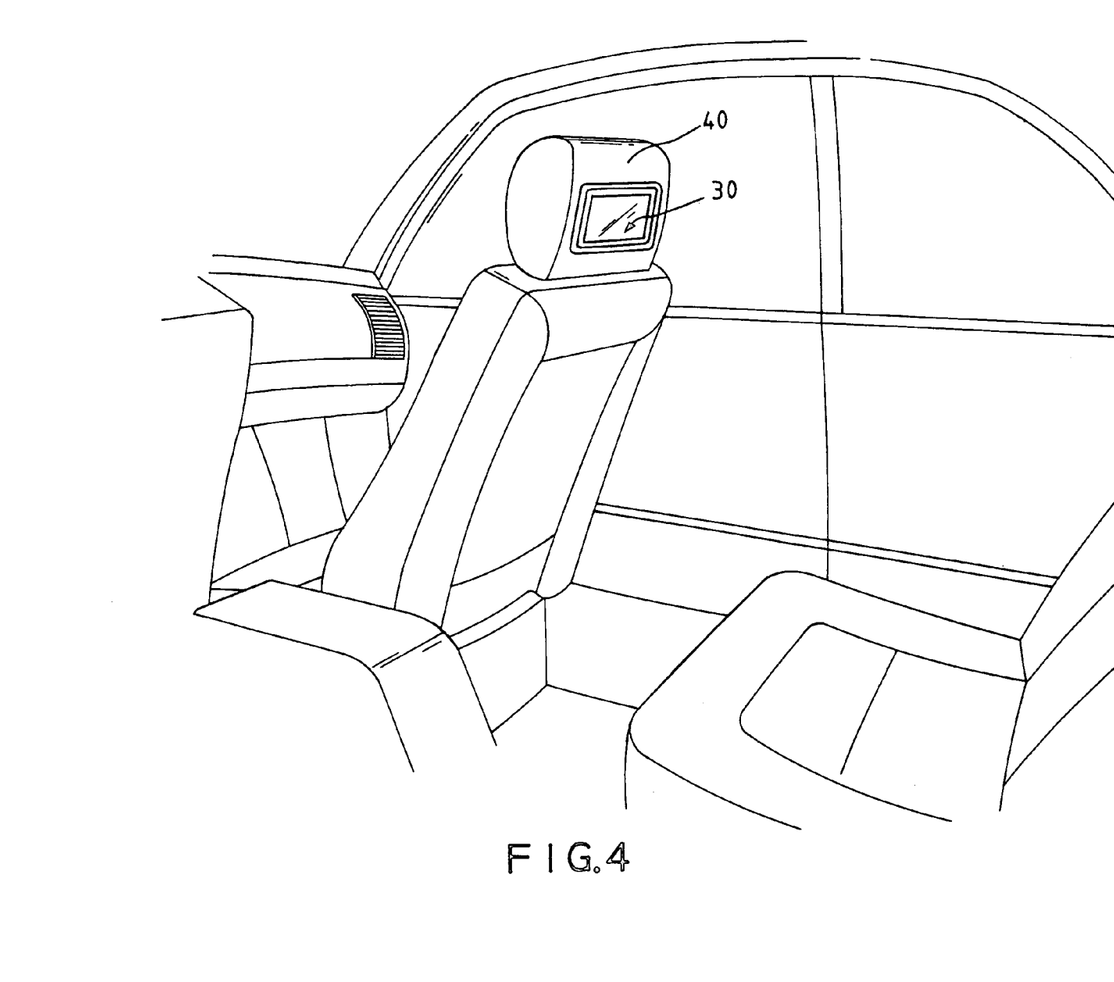
FIG. 4 illustrates a display assembly installed in the back side of the headrest of a vehicle seat according to the present invention.

Referring to FIG. 4, a view angle-adjustable detachable display assembly 30 is mounted in the back opening of the headrest 40 of a seat inside a transportation vehicle, for example, a car, airplane, ship.

Figure 5:
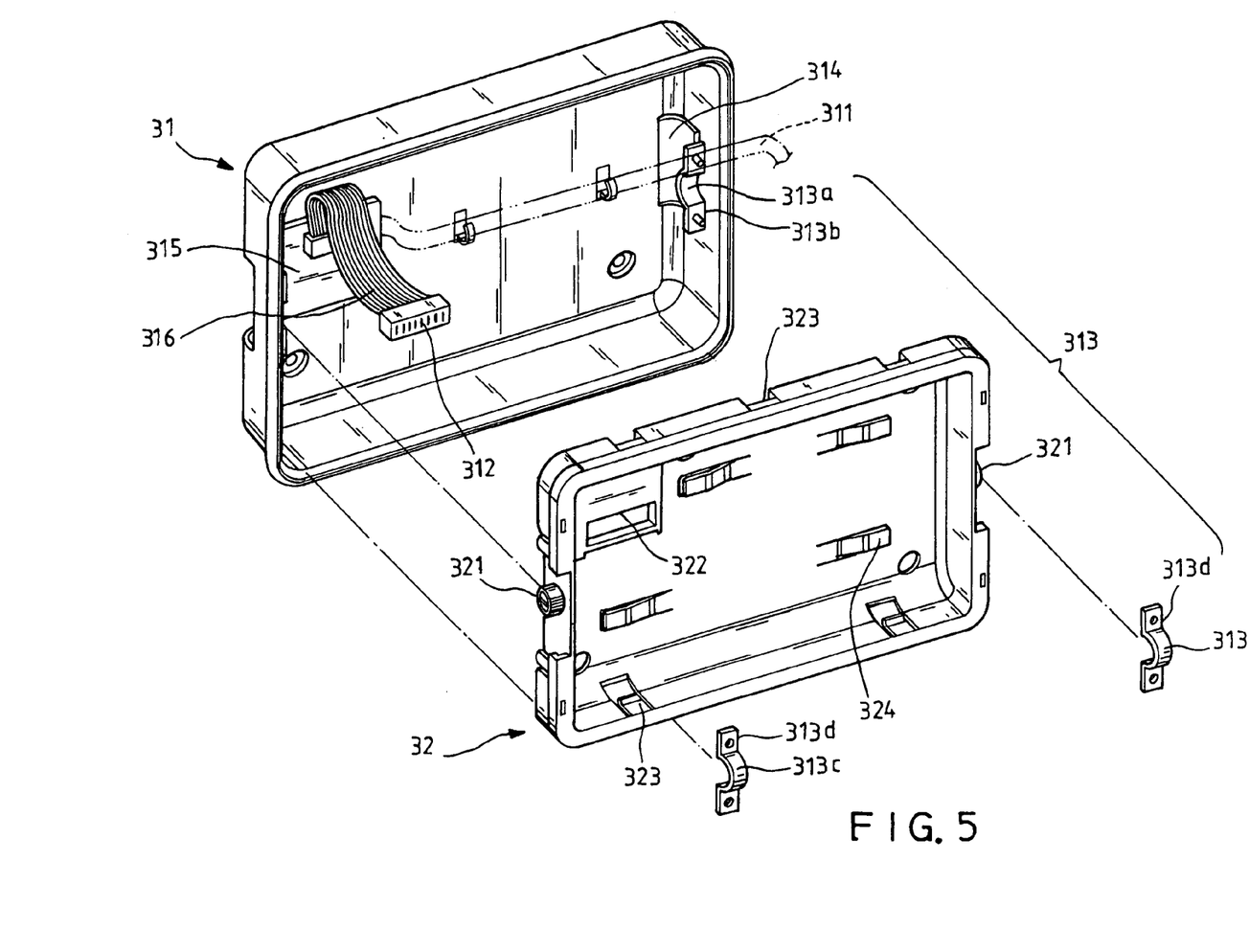
FIG. 5 is an exploded view of a part of the present invention, showing the internal structure of the outer casing and the inner casing.

Referring to FIG. 5 and FIG. 4 again, the view angle-adjustable detachable display assembly 30 comprises an outer casing 31 and an inner casing 32. The outer casing 31 is a substantially rectangular open container, having a circuit board 315 disposed on the inside, an electric connector 312 extended from the circuit board 315 through a flexible bus line 316, a through hole 314 at one lateral side remote from the circuit board 315 for the passing of a coaxial cable 311 to be connected to the circuit board 315, and two pivot housings 313 bilaterally disposed on the inside. According to the present invention, the electric connector 312 is a contact connector. The pivot housings 313 each comprise a first member 313*b* having a smoothly arched middle receiving portion 313*a*, and a second member 313*d* having a smoothly arched middle receiving portion 313c. The inner casing 32 is a substantially rectangular open container insertable into the inside of the outer casing 31, having two pivots 321 axially aligned at two opposite lateral sides on the middle. The second members 313d of the pivot housings 313 are fixedly fastened to the respective first members 313b to hold the pivots 321 of the inner casing 32 in the smoothly arched middle receiving portions 313a and 313c in between the respective first members 313b and second members 313d (see FIG. 8), for enabling the inner casing 32 to be rotated relative to the outer casing 31 and adjusted to the desired angle of inclination.

Referring to FIG. 5 again, the inner casing 32 further comprises a connector holder 322 disposed in the bottom wall for the positioning of the electric connector 312 of the outer casing 31, a plurality of springy hooks 323 symmetrically disposed at the top and bottom sides, and a plurality of spring strips 324 protruded from the bottom wall.

Figure 6:
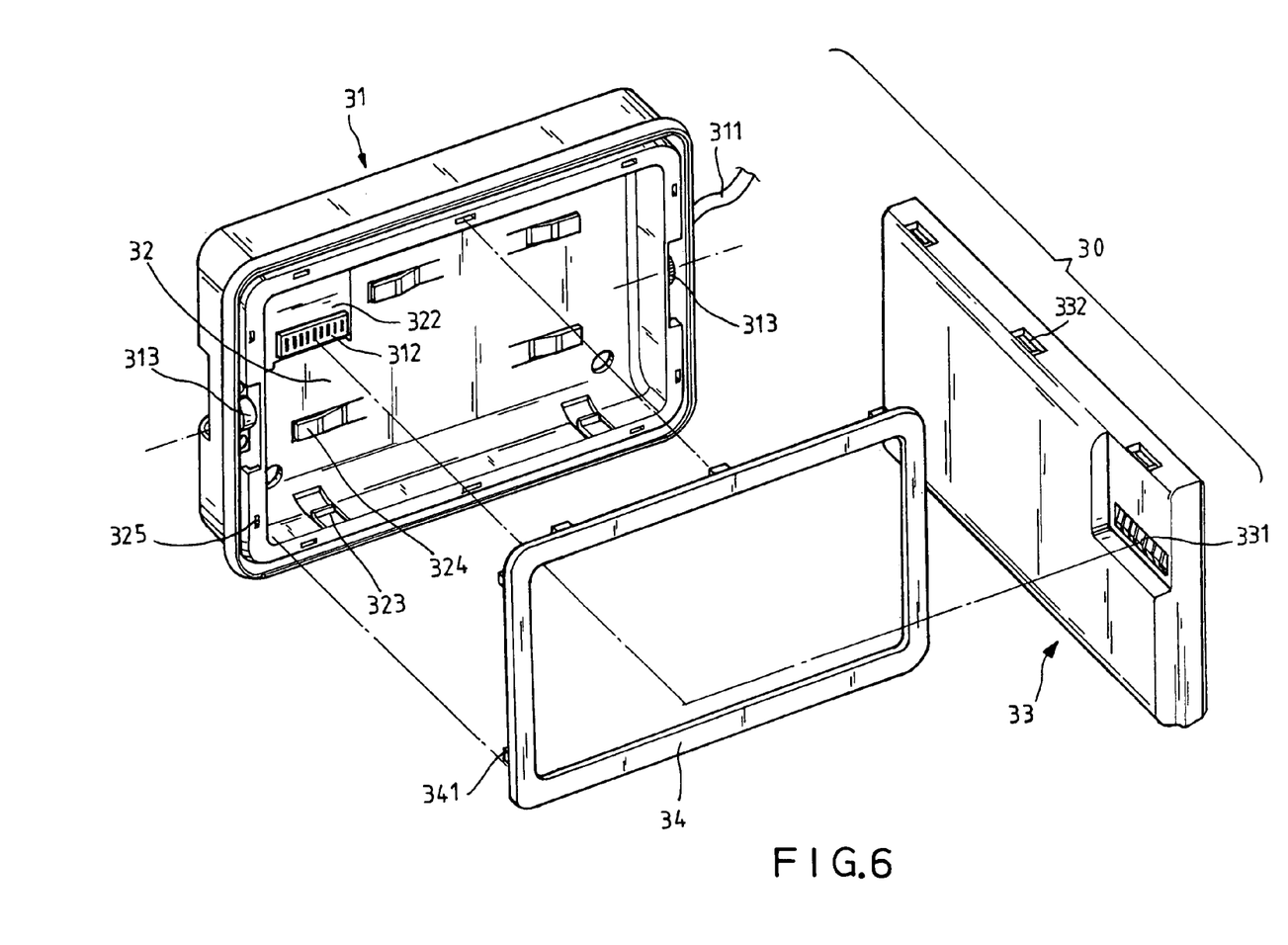
FIG. 6 is an exploded view of the present invention after insertion of the inner casing in the outer casing before installation of the ornamental packing frame and the display panel in the inner casing.
Figure 7:
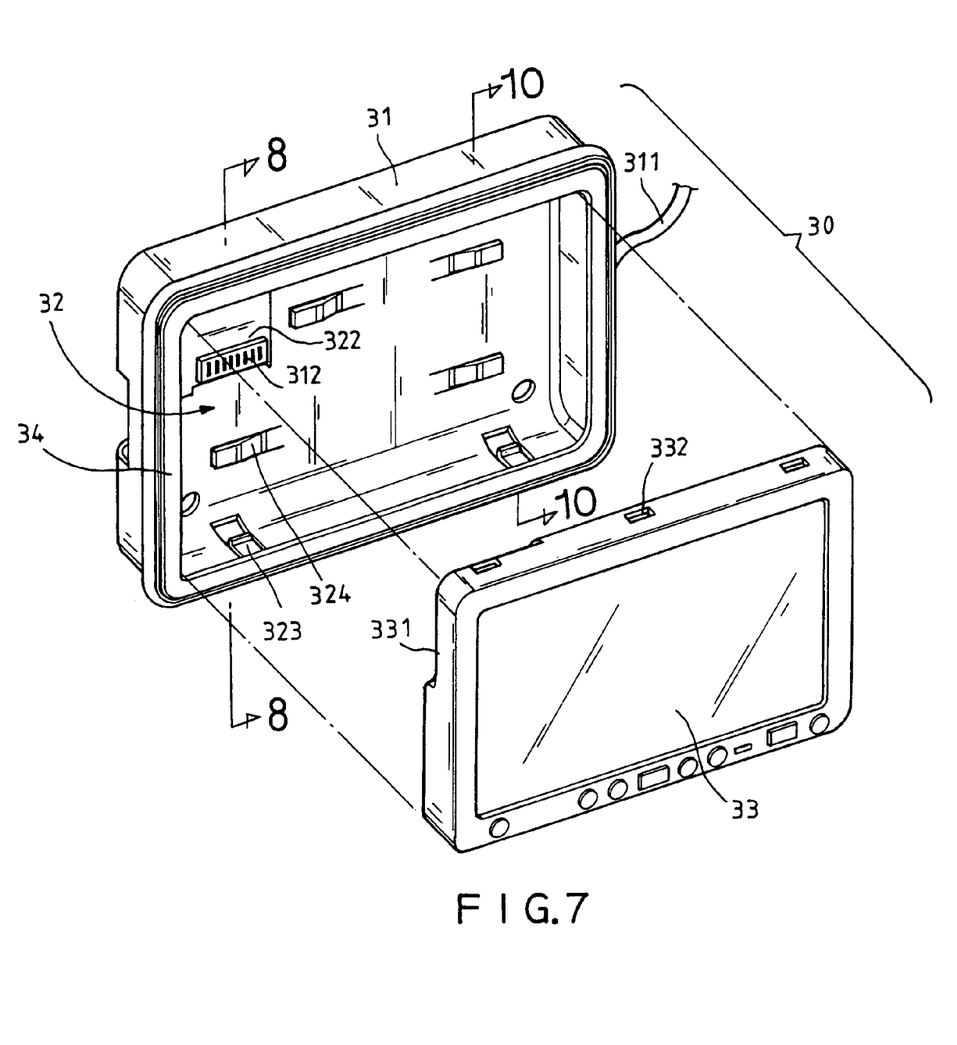
FIG. 7 is another exploded view of the present invention after installation of the ornamental packing frame in the inner casing inside the outer casing before installation of the display panel in the inner casing.

Referring to FIGS. 6 and 7, after installation of the inner casing 32 in the outer casing 31, an ornamental packing frame 34 is covered on the border area of the inner casing 32. The ornamental packing frame 34 comprises a plurality of plug rods 341 extended from the back wall and respectively fastened to respective plugholes 325 in the inner casing 32 (see FIG. 7).

Referring to FIGS. 6 and 7 again, the display assembly 30 further comprises a display panel 33 inserted into the inner casing 32 and supported on the spring strips 324. The display panel 33 comprises an electric interface 331 disposed at the back side and connected to the electric connector 312 in the connector holder 322, and a plurality of hook holes 332 respectively forced into engagement with the springy hooks 323 of the inner casing 32 (see FIG. 9).

Figure 8:
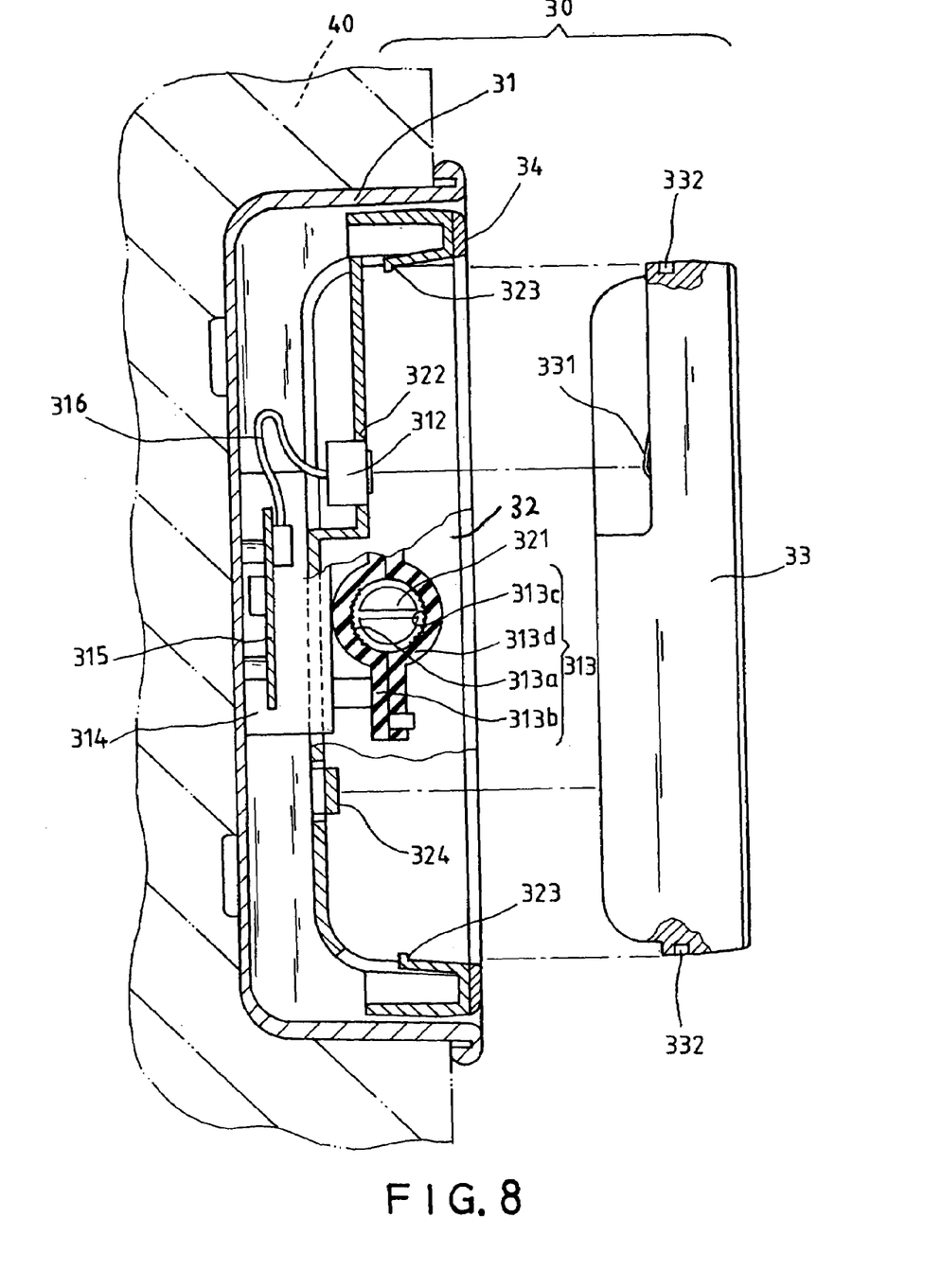
FIG. 8 is a sectional view in an enlarged scale taken along line 8—8 of FIG. 7.
Figure 9:
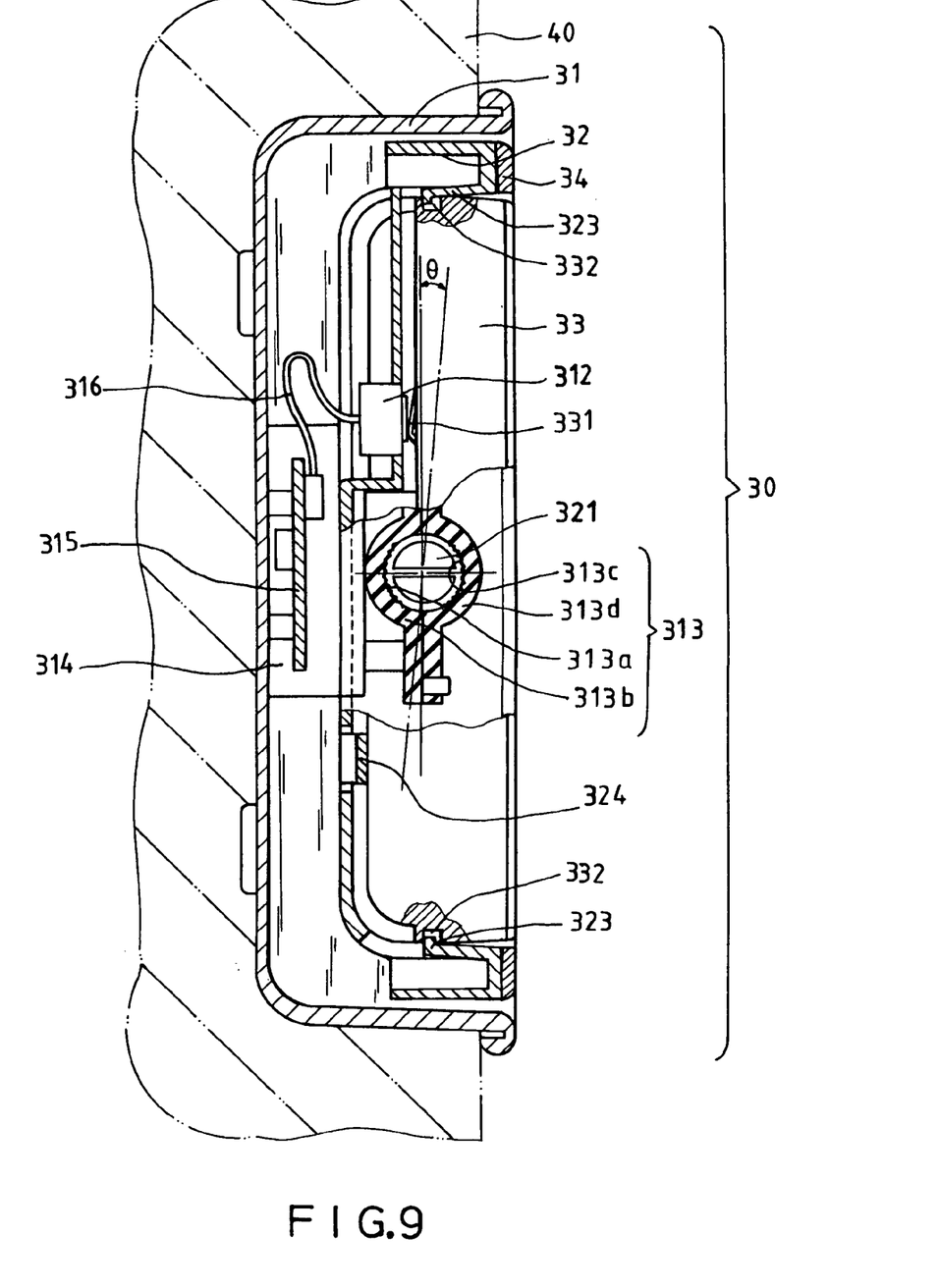
FIG. 9 is a sectional view showing the detachable display assembly assembled.
Figure 10:
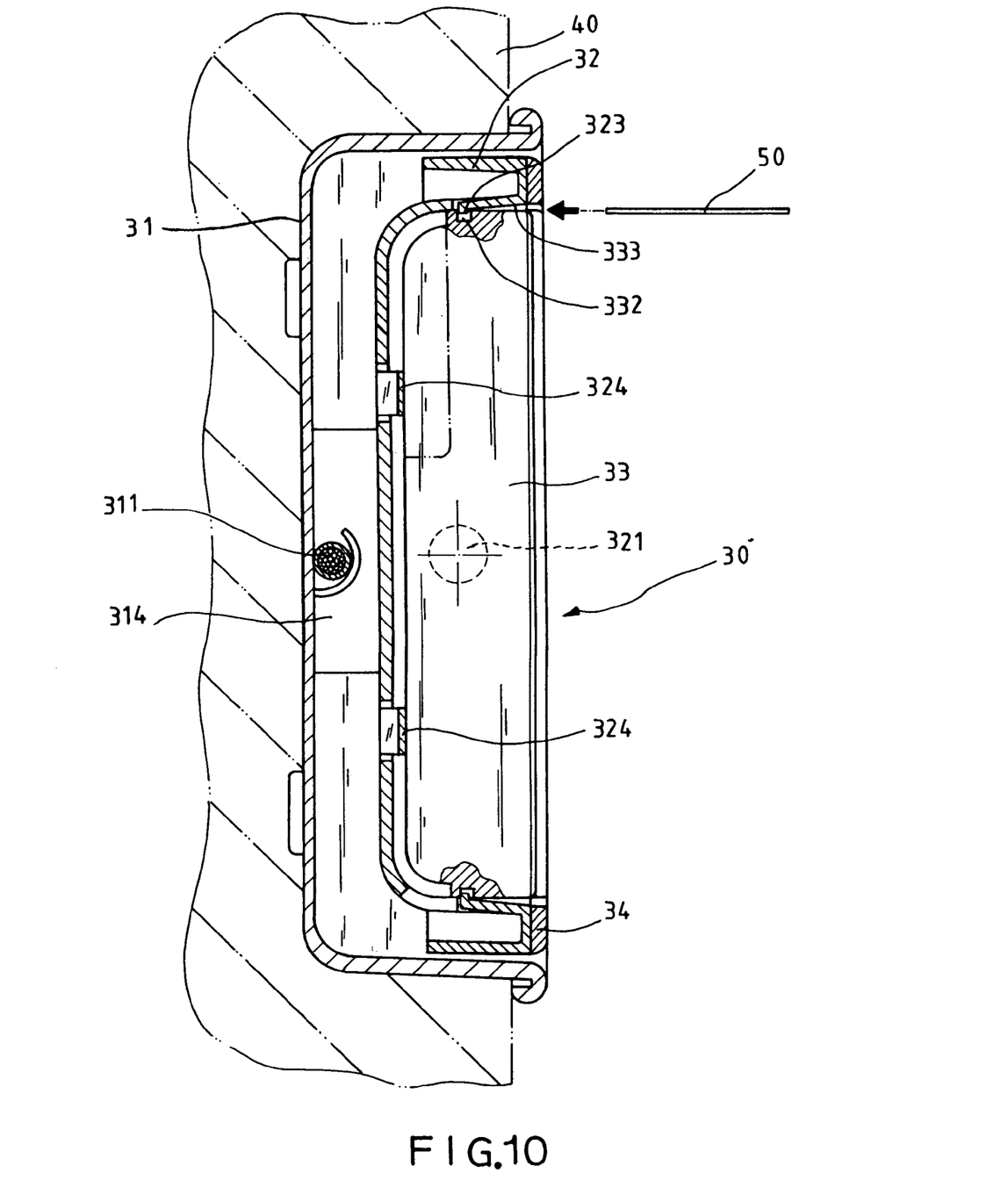
FIG. 10 is a schematic drawing showing the operation of removal of the display panel from the inner casing according to the present invention.

Referring to FIGS. 8~10, the outer casing 31 is mounted in the back side of the headrest 40, the inner casing 32 is fastened pivotally with the inside of the outer casing 31, and the display panel 33 is mounted in the inner casing 32. Upon insertion of the display panel 33 into the inner casing 31, the hook holes 332 of the display panel 33 are respectively forced into engagement with the springy hooks 323 of the inner casing 32, and the electric interface 331 of the display panel 33 is automatically connected to the electric connector 312 in the connector holder 322. At this time, the user can turn the display panel 33 with the inner casing 32 upwards or downwards relative to the outer casing 31 to the desired view angle. Because the electric connector 312 is held positively in the connector holder 322 and connected to the circuit board 315 through the flexible bus line 316, turning the display panel 33 with the inner casing 32 relative to the outer casing 31 does not interfere with the transmission of electric signal from the circuit board 315 to the display panel 33.

Referring to FIG. 10, when wishing to remove the display panel 33 from the inner casing 32, insert a thin card 50 into the gap 333 in between the display panel 33 and the inner casing 32 to disengage the springy hooks 323 of the inner casing 32 from the hook holes 332 of the display panel 33, for enabling the display panel 33 to be pushed outwards from the inner casing 32 by the spring force from the spring strips 324.

As indicated above, the inner casing 32 is fastened pivotally with the inside of the outer casing 31, and the display panel 33 is detachably mounted in the inner casing 32 and electrically connected to the electric connector 312 by the electric interface 331 through a contact connection. Therefore, the display panel 33 can easily be installed in the casings 31 and 32, or separated from the casings 31 and 32 for use independently.

A prototype of view angle-adjustable detachable display assembly has been constructed with the features of FIGS. 4~10. The view angle-adjustable detachable display assembly functions smoothly to provide all of the features discussed earlier.

Although a particular embodiment of the invention has been described in detail for purpose of illustrated, various modifications and enhancements may be made without departing from the spirit and scope of the invention. Accordingly, the invention is not to be limited except as by the appended claims.

What is claimed is:

1. A view angle-adjustable detachable display assembly comprising:
    an outer casing connectable to the back opening of the headrest of a vehicle seat, said outer casing comprising a cable, a contact connector connected to said cable and adapted to receive electric signal from said cable, and two pivot housings disposed at two opposite lateral sides;
    an inner casing fastened pivotally with the inside of said outer casing, said inner casing comprising two pivots axially aligned at two opposite lateral sides thereof and respectively pivoted to the pivot housings of said outer casing, a connector holder, which holds the contact connector of said outer casing, a plurality of springy hooks symmetrically disposed at top and bottom sides thereof, and a plurality of spring strips protruding from a bottom wall thereof; and
    a display panel insertable into said inner casing, said display panel comprising a plurality of hook holes, which are respectively forced into engagement with the springy hooks of said inner casing upon insertion of said display panel into said inner casing, an electric interface, which is electrically connected to said contact connector in said connector holder upon insertion of said display panel into said inner casing, and a back side, which is supported on the spring strips of said inner casing upon insertion of said display panel into said inner casing.

2. The detachable display assembly as claimed in claim 1, wherein said outer casing comprises a side through hole for the passing of said cable, a circuit board fixedly mounted on the inside and connected to said cable, and a flexible bus line connected between said circuit board and said contact connector for transmission of signal from said cable to said contact connector and said contact interface.

3. The detachable display assembly as claimed in claim 1, wherein the pivot housings of said outer casing each comprise a first member and a second member fastened to said first member, said first member and said second member each having a smoothly arched receiving portion matching each other and adapted to receive one pivot of said inner casing.

4. The detachable display assembly as claimed in claim 1, further comprising an ornamental packing frame covered on a border area of said inner casing.

5. The detachable display assembly as claimed in claim 1, wherein a gap is left between said display panel and said inner casing for the insertion of a thin card to disengage said springy hooks from said hook holes after installation of said display panel in said inner casing.

* * * * *